United States Patent
Rill et al.

(10) Patent No.: US 9,293,135 B2
(45) Date of Patent: Mar. 22, 2016

(54) COUNTERMEASURES FOR VOICE RECOGNITION DETERIORATION DUE TO EXTERIOR NOISE FROM PASSING VEHICLES

(71) Applicants: VOLKSWAGEN AG, Wolfsburg (DE); AUDI AG, Ingolstadt (DE)

(72) Inventors: Florian Rill, Palo Alto, CA (US); Carol Funes, San Jose, CA (US); Andreja Janezic, Palo Alto, CA (US); Holger Hees, Saratoga, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 328 days.

(21) Appl. No.: 13/933,241

(22) Filed: Jul. 2, 2013

(65) Prior Publication Data
US 2015/0012267 A1 Jan. 8, 2015

(51) Int. Cl.
*H04B 1/00* (2006.01)
*G10L 15/20* (2006.01)
*G10K 11/175* (2006.01)
*G10L 15/22* (2006.01)

(52) U.S. Cl.
CPC .............. *G10L 15/20* (2013.01); *G10K 11/175* (2013.01); *G10L 2015/228* (2013.01)

(58) Field of Classification Search
CPC .............................. G10L 15/20; G10K 11/175
USPC .................................................. 381/56, 57, 86
See application file for complete search history.

(56) References Cited

U.S. PATENT DOCUMENTS

| | | | |
|---|---|---|---|
| 7,171,003 B1 | 1/2007 | Venkatesh et al. | |
| 8,285,545 B2 * | 10/2012 | Lee et al. | 704/233 |
| 2006/0167687 A1 * | 7/2006 | Kates | 704/235 |
| 2006/0200345 A1 * | 9/2006 | Kooiman | 704/233 |
| 2008/0154438 A1 * | 6/2008 | Kalik | 701/1 |
| 2010/0172510 A1 * | 7/2010 | Juvonen | 381/71.6 |
| 2012/0230504 A1 * | 9/2012 | Kuroda | 381/71.4 |

FOREIGN PATENT DOCUMENTS

| | | |
|---|---|---|
| DE | 102010040818 A1 | 4/2011 |
| DE | 102009057981 A1 | 6/2011 |
| WO | 2012145110 A2 | 10/2012 |

* cited by examiner

*Primary Examiner* — Davetta W Goins
*Assistant Examiner* — Daniel Sellers
(74) *Attorney, Agent, or Firm* — Barnes & Thornburg LLP (57) ABSTRACT

Mitigating disruption to a voice recognition system in a vehicle caused by a passing source of noise is provided. Sensors sense an approaching truck or the like that is likely to disrupt operation of the in-vehicle voice recognition system. Countermeasures are initiated to mitigate the disruption.

26 Claims, 5 Drawing Sheets

COUNTERMEASURES FOR VOICE RECOGNITION DETERIORATION DUE TO EXTERIOR NOISE FROM PASSING VEHICLES

BACKGROUND

Voice recognition systems require a high quality input voice (speech) signal to work properly. Similarly, the remote party of an in-vehicle mobile phone conversation will best understand what is being said if the input voice signal contains a minimum of extraneous sound. In either case, the quality of the input signal can be compromised by sound sources other than the input voice signal (i.e., background noise) that are active during the listening period of a phone conversation, or the voice recognition period of a speech recognition system. The result can be poor communication, false recognition, or no recognition at all. This problem is known to happen in automobiles where tire, wind, or engine noise is present while driving. Background noise that is constant in amplitude and frequency range can be mitigated somewhat using sound dampening, active noise cancellation (ANC) systems, and the like. However, such measures can be ineffective when sudden changes in background noise amplitude and frequency occur, such as when passing or being passed by a loud vehicle, like a truck for example. Conventional ANC methods may be disrupted because their cancellation signal may be computed by generating a frequency and amplitude profile of the background noise over a certain amount of time, and the profile cannot accommodate amplitude or frequency changes that occur within a shorter amount of time. Alternatively, a phase-inverse signal based, for example, on a secondary microphone arranged to receive background noise may be combined with a primary voice microphone signal to mitigate the effect of external noise on the input signal. However, this method may have a limited effective frequency range, or may be adversely affected by a processing delay. Therefore these prior art methods are often not sufficient to prevent disruption to voice recognition systems or mobile phone conversations caused by the sudden appearance of loud external noise.

SUMMARY

Mitigating disruption to a voice recognition system in a vehicle caused by a passing source of noise is provided. Sensors sense an approaching truck or the like that is likely to disrupt operation of an in-vehicle voice recognition system. Countermeasures are initiated to mitigate the disruption.

In illustrative embodiments, countermeasures can include providing a warning message regarding a disruptive sound about to be encountered. Sensor data may be used to select one of a plurality of stored noise classes representative of various noise sources, and the countermeasure may be based on the selected noise class. In embodiments, the noise classes may be associated with corresponding noise profiles representative of various noise sources. A select noise profile can be used to enhance noise mitigation, such as by providing initial conditions for use in an active noise cancellation (ANC) system.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions of the present disclosure may have been simplified to provide for a clear understanding of the described devices, systems, and methods, while eliminating for the purpose of clarity other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements and operations, and variations and modifications to the described aspects that would be known to those of ordinary skill in the art.

The present disclosure relates to a system, components, and methodologies for countering adverse effects on in-vehicle systems using voice inputs, such as speech recognition and telephone systems, from an approaching source of disruptive noise such as a passing vehicle. In particular, the present disclosure is directed to a system, components, and methodologies that counter adverse effects on speech recognition and the like, including sensors that sense an approaching source of noise and countermeasure mechanisms to mitigate any adverse impact the approaching noise may have on in-vehicle systems with voice inputs.

Being passed by a noisy vehicle, or passing a noisy vehicle oneself, may cause sudden changes in background noise of a subject vehicle (hereinafter, "user's vehicle") that can be anticipated using one or more sensors, such as radar, ultrasonic, audio, and/or video sensors, to detect the approaching noisy vehicle. In exemplary scenarios, the noisy vehicle may be travelling on the same road or highway as the user's vehicle, and in the same direction. If so, the user's vehicle may be behind and moving faster than the noisy vehicle and may expect to pass it, or may be in front of and moving slower than the noisy vehicle and may be expected to be passed by it. Alternatively, the noisy vehicle may be travelling in the opposite direction as the user's vehicle. Or, the noisy vehicle may be traveling along a different path that will intersect the path of the user's vehicle, such as a train at a railroad crossing. Of course, other scenarios are also possible in which a recognizable source of noise approaches the user's vehicle. For simplicity, such a recognizable approaching noise source is deemed to be included within the scope of the term "noisy vehicle", even if the recognizable noise source is not a vehicle.

Figure 1:
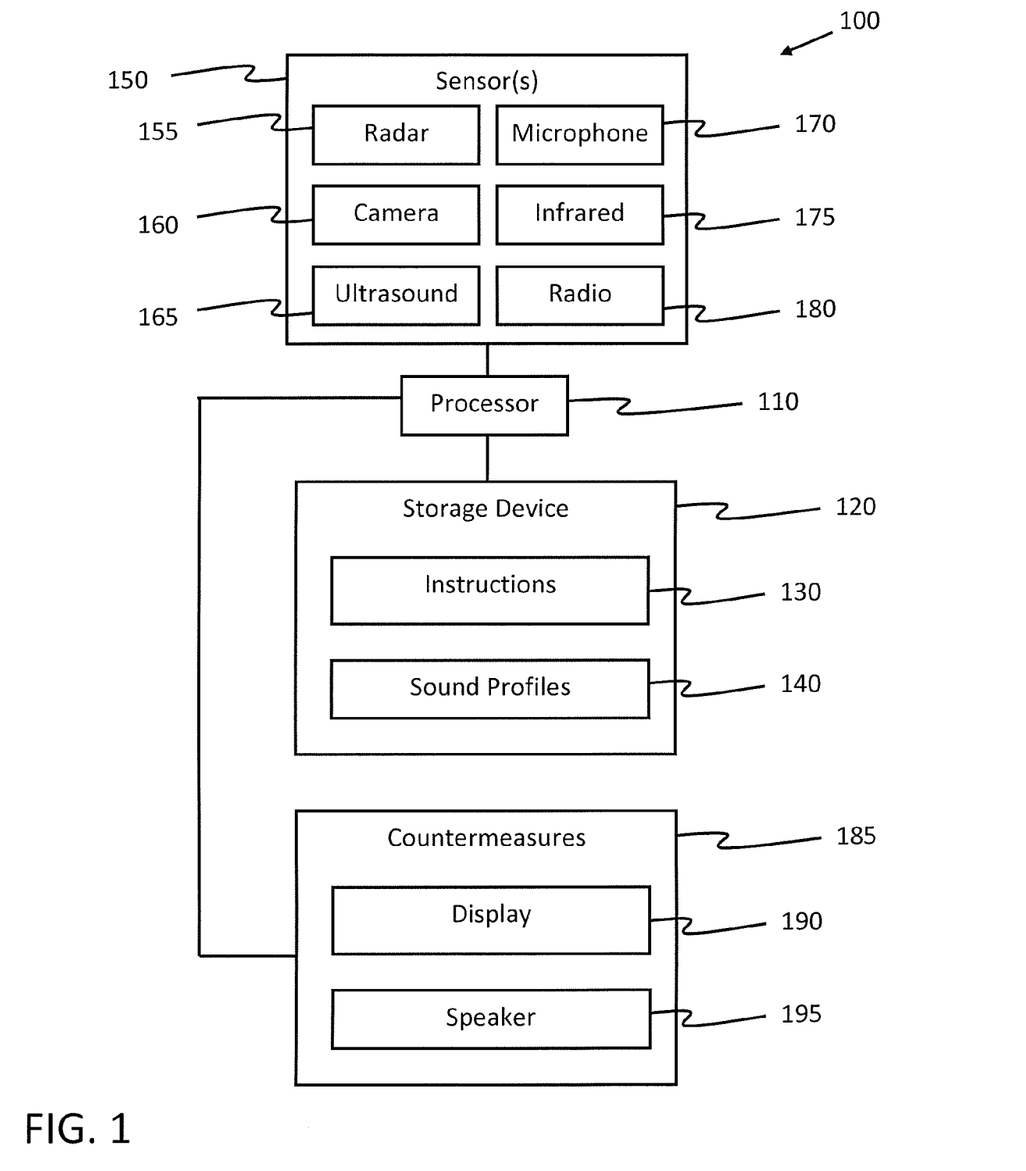
FIG. 1 is a block diagram of a system to mitigate the effect of a passing noise source on the operation of voice equipment in accordance with the disclosure.

FIG. 1 is a block diagram of a system 100 for implementing countermeasures for voice recognition deterioration due to exterior noise from passing vehicles. As shown, the system comprises a processor 110, a data storage device 120, one or more sensors 150, and one or more countermeasure devices 185. The processor may be a computing microprocessor, for example, and the data storage device may be a computer readable solid state static memory or other computer readable device such as a magnetic or optical disk drive or the like. The storage device stores processor-readable instructions 130 which, when executed on the processor, cause system 100 to perform the herein disclosed operations and methods.

Sensors 150 provide information about the user vehicle's environment, and are able to detect an approaching noise source such as a noisy vehicle. Sensor data may provide information about the size of the noisy vehicle, its position relative to the user's vehicle, and its velocity (speed and direction relative to the user vehicle). Based on the sensor data, processor 110, which is communicatively coupled to the sensors, may execute instructions 130 to assess when and where the user's vehicle and the noisy vehicle are expected to pass each other. The processor may also assess a type (classification) of the noisy vehicle, and may estimate the likelihood that the noise of the approaching noisy vehicle will be sufficient to disrupt a system within the user's vehicle that includes a voice input when the noisy vehicle passes the user's vehicle. Such a voice input system may be, for example, a speech detection system (SDS) in the user's vehicle, a mobile telephone in the user's vehicle, or the like. In embodiments, the processor may output an anticipated noise event classification. From this classification, the processor may select a noise profile from a plurality of profiles 140 stored in storage device 120. The noise profile selected is the one having characteristics most consistent with characteristics of the anticipated noise event. The selected profile may thus take into account all of the sensor data. In addition, in embodiments, the selected profile may also take into account acoustical properties of the environment in which the noise event is expected to occur (e.g., an open road versus a city street), and may also take into account the acoustical properties of the passenger compartment of the user's vehicle. Further, a road classification of the road on which the vehicle is traveling may be derived using GPS as a sensor in conjunction with map data. The road classification may include highway, city road, dirt road, and the like, as well as speed limit information. Such classification may be incorporated when selecting a noise profile.

In embodiments, the system may use GPS to log the location, time, selected noise profile, effectiveness of countermeasures and other parameters of a noise disturbance. A data connection to an online server, such as a cellular telephone connection or the like, may be used to share such data with other users and warn them ahead of time of locations with high numbers of disturbances. For example, certain disturbances may occur at specific locations and/or specific times, such as aircraft noise while passing an airport, train noise close to train tracks, road construction sites, or noise from passing cars that is amplified while driving through a tunnel that might otherwise be below the threshold level.

The sensors providing sensor data may be dedicated to the countermeasure system, or may have other purposes as well. For example, shared sensors may include any of the following that may be present in the user's vehicle. One or more radar antennae 155 that may operate for example to obviate blind spots when changing lanes while driving. One or more cameras 160, such as rear facing cameras for use when backing up the user's vehicle, and/or front facing cameras for use in conjunction with a cruise control system or the like. One or more ultrasonic sensors 165 for use in range detection, for example, located in bumpers for use in a parking assist system. One or more microphones 170 for use in a noise suppression system. In addition, one or more such sensors, or other sensors, may be dedicated to the operation of the herein disclosed voice input disruption mitigation system.

User vehicle sensors may also include one or more signal detectors operative to detect signals from emergency vehicles and the like that are capable of manipulating traffic light operation, so that such a vehicle has the right-of-way and conflicting traffic is stopped. Traffic signal preemption (also called traffic signal prioritization) modifies the normal operation of traffic lights, such as to assist emergency vehicles. Those systems manipulate traffic signals in the path of an emergency vehicle to stop conflicting traffic and provide the emergency vehicle the right-of-way, thereby reducing emergency vehicle response times and enhancing traffic safety. Signal preemption may also be used at railroad grade crossings to prevent collisions, and by light-rail rapid transit systems to allow public transportation priority access through intersections to improve commute times. Thus, traffic preemption signals are often associated with emergency vehicles that have sirens or locomotives that have loud whistles, where the sirens or whistles may be used only briefly at intersections or crossings. A traffic signal preemption signal may thus enable the user's vehicle to anticipate and prepare to mitigate the effects of such disruptive sirens and whistles even before they operate.

Traffic preemption devices are implemented in a variety of ways. For example, in emergency vehicles they may be arranged to operate in conjunction with the emergency vehicle's warning lights and siren. When activated, the traffic preemption device causes properly-equipped traffic lights in the path of the emergency vehicle to cycle immediately to grant right-of-way to the emergency vehicle, after allowing for normal programmed time delays for signal changes and pedestrian crosswalks to clear. This may be done using a traffic preemption emitter in the emergency vehicle that sends a signal that is received by a receiver associated with the traffic light to be controlled. Several technical solutions for the transmission of the traffic preemption signal are available, including short-range radio, GPS, ultrasound, and infrared signals. Thus, the user's vehicle could be equipped with one or more dedicated receivers operative to receive such traffic preemption signals, thereby detecting emergency vehicles in the area and enhancing the user vehicle's ability to respond to a potential emergency vehicle noise event. Such receivers may include infrared receiver 175 and/or radio receiver 180, for example.

When the sensors in the user's vehicle sense the approach of a noisy vehicle, one or more voice system disruption countermeasures can be initiated. In embodiments, a visual and/or audible message can be presented to the user regarding the anticipated increase in background noise and the attendant compromised functionality of the voice system. Such a message can be presented for example on display 190 and/or speaker 195.

In other embodiments, a noise suppression system may be triggered in anticipation of an expected encounter with the noisy vehicle. Such systems are referred to herein as active noise cancellation (ANC) systems. It is well known that sound comprises pressure waves that consist of a compression phase and a rarefaction phase. In an ANC system, a noise-cancellation speaker emits a sound wave with the same amplitude as the sound being suppressed, but with inverted phase (antiphase) to the original sound. The waves combine and interfere to effectively cancel each other out by so-called phase cancellation. In embodiments, an ANC system may be implemented by executing instructions 130 on processor 110 and outputting a noise suppression signal to one or more speakers 195.

In conventional noise suppression systems used in car interiors, sound mitigation is most effective for canceling repetitive (or periodic) noises such as engine noise. Such systems typically use fast Fourier transform (FFT) analysis to resolve repetitive sounds into a plurality of frequency components for which noise cancellation is easier to apply. However, the sounds for which the herein disclosed countermeasures are needed are dynamic and transient, and therefore conventional sound suppression systems are much less effective at suppressing them.

To improve the effectiveness of noise suppression systems in these circumstances, embodiments of the herein disclosed apparatus, systems, and methods include a plurality of stored sound profiles 140. The sound profiles are representative of a variety of different noisy vehicles and the like, and may also take into account various acoustic environments in which the noisy vehicles may be encountered. The sound profiles may be based on or include recorded sound samples, or may be electronically generated to resemble known sounds or one or more select components of known sounds. Further, the sound profiles may take into account the acoustical environment of the passenger compartment of the user's vehicle, i.e., to reproduce the sound of a passing vehicle as it would be experienced by a driver of the user vehicle, for example.

More particularly, ANC systems may use analog or digital signal processing. For example, in an embodiment the ANC system may be arranged to obtain an analog background noise signal from a first microphone, and subtract it from an analog voice signal obtained from a second microphone to produce an improved voice signal as an input to an SDS, telephone, or other system that uses a voice signal. In another embodiment, the background noise signal and voice signal can be digitized and combined digitally.

In yet another embodiment, the ANC system may include an adaptive filter. An adaptive filter is a filter that self-adjusts its transfer function according to an optimization algorithm driven by an error signal. Here, the transfer function represents the relation between the input and output of the noise cancellation system. An adaptive filter can be useful in a noise suppression application because some of the parameters of the acoustic environment, such as the locations of reflective surfaces in a reverberant space, and the position and velocity of the source of noise, are not known in advance. Adaptive filters digitally analyze the waveform of the background noise and generate a signal that effectively inverts it. The inverted signal can then be amplified and sent to a transducer, such as a speaker, to create a sound wave of similar amplitude and inverted phase from the original background noise waveform, thereby creating destructive interference. The destructive interference effectively reduces the volume of the background noise. Thus, one or more noise-cancellation speakers may be arranged in the passenger compartment of the user's vehicle to attenuate the sound of the noisy vehicle as it passes by.

Adaptive filters use feedback in the form of an error signal to refine their transfer function to match the changing parameters. However, such analysis takes time and thus incurs latency, i.e., it takes the adaptive filter awhile to "hone in" on an appropriate noise cancellation signal. Further, the transfer function must be updated frequently during a noise event to adapt to changing conditions. Therefore, in an embodiment an adaptive filter may be implemented using initial parameters that approximate the anticipated conditions of the noise source and the acoustic environment at the beginning of the noise event. Because the selected profile includes an estimate of those conditions based on an analysis of the sensor data, the selected noise profile can be used by the adaptive filter to determine its initial parameters, thereby improving its effectiveness at the beginning of the noise event. Thus, the ANC with adaptive filter can use the selected vehicle noise profile when the noise event begins, and then adjust in real time as the noise event progresses.

In embodiments that include stored sound profiles, one of the profiles may be selected for use in suppressing the sound of the noisy vehicle based on the sensor data. The sensor data can be used to identify one or more of the noisy vehicle type, its velocity (speed and direction) relative to the user's vehicle, an estimate of the time expected to elapse before the vehicles pass each other, an estimate of the noisy vehicle's position, velocity, and/or path relative to the user vehicle as they pass each other, and sensed or stored characteristics of the acoustical environment in which the encounter is expected to occur. These noise characteristics may be analyzed and used to derive a noise event classification representative of all of the available information of the anticipated noise event.

In an embodiment, the noise profile may be selected that is most closely representative of the noise classification derived using the sensor data. The selected noise profile may then be used in an ANC system that engages immediately upon detection of the beginning of the disruptive event. As described previously, the filter may use the selected profile to modify a voice signal to provide an improved input signal for an SDS or mobile telephone by removing the disruptive sound from the voice input and improve the voice signal quality, should a phone or SDS be in use during the noise event.

Thus, the herein disclosed apparatus, systems, and methods provide for the recognition and classification of looming noise events that could compromise the operation of a system that uses a voice input signal, such as a mobile phone or SDS, and implement one or more countermeasures based on the classification. The recognition and classification of looming noise events include analyzing sensed conditions from one or more sensors. Countermeasures may include issuing a warning to a driver, filtering external noise from a microphone input, and providing initial conditions for a transfer function of an automated noise cancellation (ANC) system to improve its operation. The initial ANC noise filtering and/or transfer function conditions may be improved by the selection of an appropriate noise profile based on the noise event classification.

Figure 2:
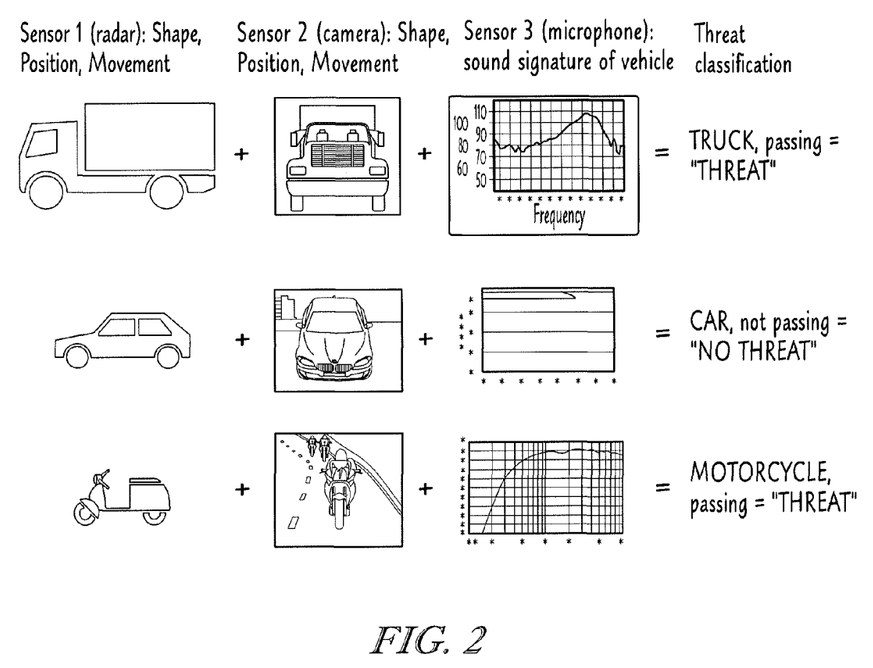
FIG. 2 illustrates exemplary elements of object and event classification operations in accordance with the disclosure.

FIG. 2 illustrates exemplary elements of object and event classification operations. A system with three sensors is illustrated, a radar antenna (sensor 1), a camera (sensor 2), and a microphone (sensor 3), although other sensors may also or alternatively be used. As shown, the radar can determine the shape, position, and movement of a target. Camera data can also be used to determine or confirm the shape, position, and movement of the target. The microphone senses a sound signature of the approaching vehicle. The sensed information is used to classify an upcoming noise event and determine whether it is likely to be loud enough to disrupt operation of an SDS or the like. In FIG. 2, it is determined that a truck is about to pass the user's vehicle, and it represents a threat to the operation of the SDS. Later, a car is also detected, but is determined not likely to present a threat. Next, an approaching motorcycle is detected and determined to be a likely threat.

Figure 3:
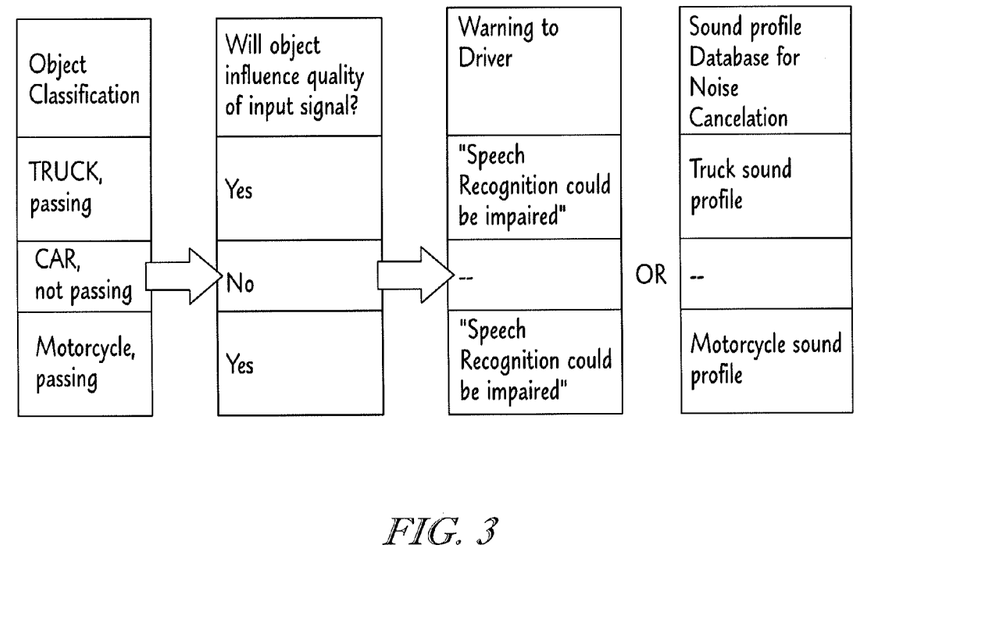
FIG. 3 is a block diagram illustrating implementation of countermeasures in accordance with the disclosure.

FIG. 3 is a block diagram illustrating implementation of countermeasures in accordance with the detected threats. As shown, it is determined whether the detected object is likely to influence the quality of a voice input signal. If so, a countermeasure is initiated. The countermeasure may include an announcement that speech recognition could be impaired, for example. Alternatively or in addition, a countermeasure may be initiated that selects a stored sound profile and uses it for noise cancellation, as described previously. In FIG. 3, in one case the profile selected is representative of the noise expected to be produced by the passing truck. In another case, the profile selected is representative of the noise expected to be produced by the passing motorcycle.

Figure 4:
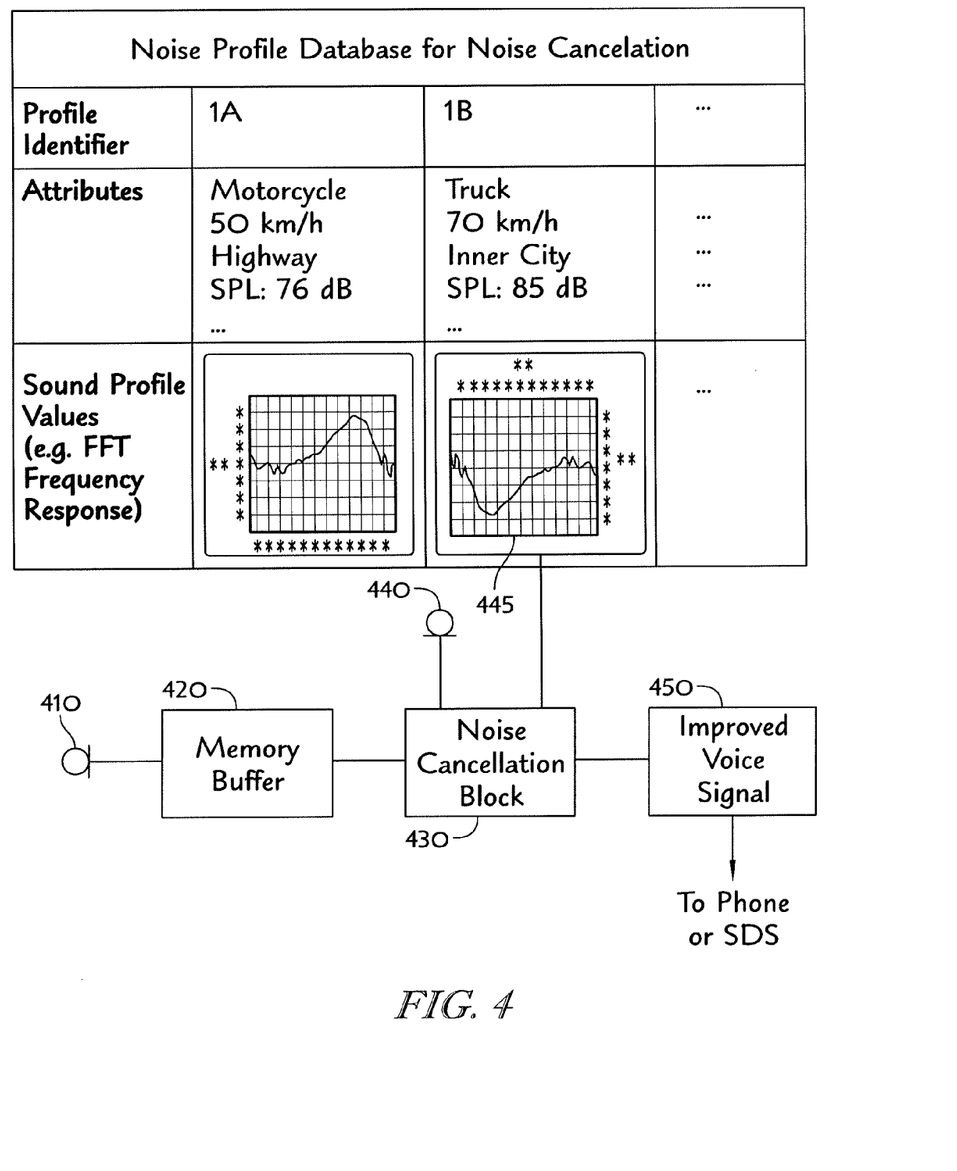
FIG. 4 is a noise profile database and function block diagram in accordance with the disclosure.

FIG. 4 illustrates the use of a noise profile database in a functional block diagram. As shown, microphone 410 obtains a voice signal from a speaker in the user's vehicle. Microphone 410 may be arranged to most effectively obtain a voice signal from the driver, for example. The voice signal is stored in memory buffer 420. Noise cancellation block 430 then removes a background noise signal from the voice signal. Some or all of the background noise signal may be obtained from a second microphone 440. The second microphone may be oriented away from the driver, to more effectively pick up background noise in the passenger compartment other than the driver's voice, for example. Alternatively or in addition, the background noise signal may be or include a sound profile selected from a plurality of stored profiles based on an analysis of the sensor data. As shown, in the case of the passing motorcycle of FIG. 2, noise profile 1A may be selected based on its sensed attributes. As shown, those attributes include the identification of the noisy vehicle as a motorcycle, travelling at 50 km/h in a highway environment, and producing a sound pressure level (SPL) of 76 dB. The sound profile may be a sampled motorcycle sound, or may include an FFT of such a sound, represented by the frequency response curve shown. In another noise event, such as the case of the passing truck of FIG. 2, noise profile 2B may be selected based on its sensed attributes. As shown, those attributes include the identification of the noisy vehicle as a truck, travelling at 70 km/h in a city environment, and producing an SPL of 85 dB.

The noise cancellation block 430 modifies the buffered voice signal using one or both of background noise from microphone 440 or the selected noise profile, to provide an improved voice signal 450. The improved voice signal is then used as the input to the phone, SDS, or other system that uses a voice input.

Figure 5:
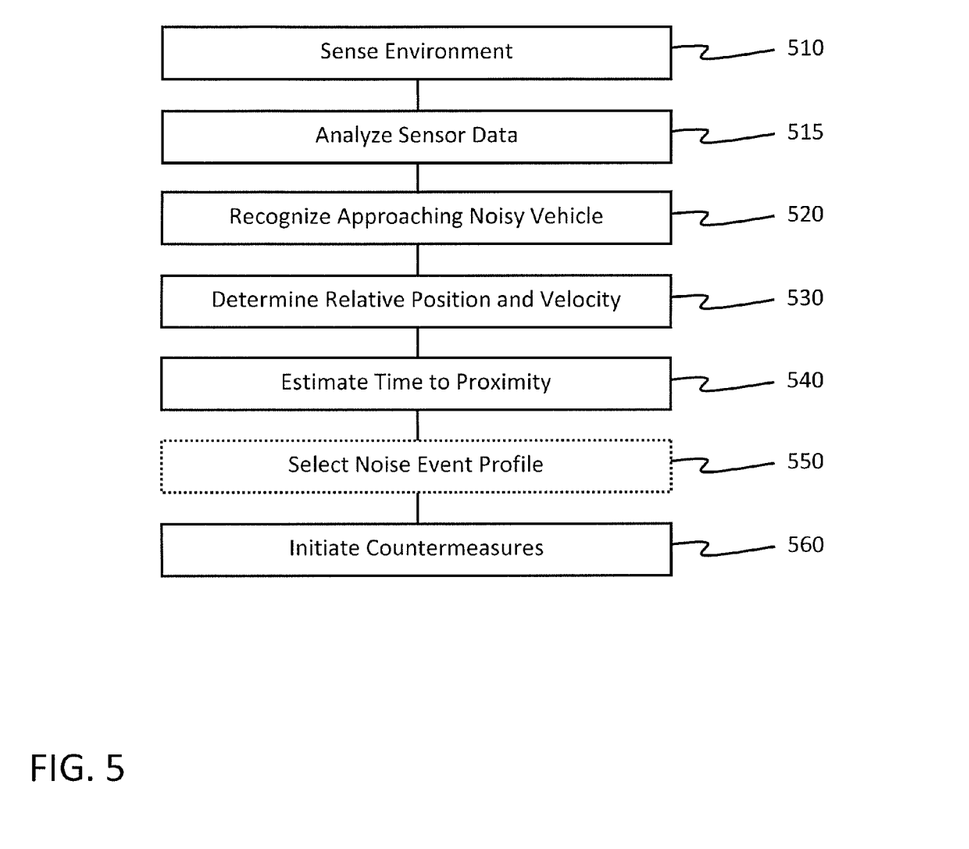
FIG. 5 is an exemplary method of implementing a voice system disruption countermeasure in accordance with the disclosure.

FIG. 5 is an exemplary method of implementing a voice system disruption countermeasure. Sensors are used to sense the environment of the user's vehicle, 510, and produce sensor data. The sensor data is analyzed, 515, and an approaching noisy vehicle is recognized, 520. The position and velocity of the noisy vehicle are determined using the sensor data, 530, and the time remaining until the noisy vehicle is expected to be proximate the user's vehicle is estimated, 540. That time is used to determine when countermeasures are to be initiated, and at the appropriate time the countermeasures are initiated, 560. If a countermeasure requires it, the sensor data is analyzed to classify the anticipated noise event, and one of a plurality of stored noise profiles is selected that is most representative of the expected noise event, 550. That noise profile is then used in the countermeasure that requires it, 560.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A system for countering disruption to a voice recognition system in a vehicle caused by a source of noise in proximity to the vehicle, comprising:
   an in-vehicle microphone that obtains a voice signal for input to the voice recognition system;
   a plurality of sensors each operative to sense a condition external to the vehicle;
   a tangible data processor coupled to the sensors and in data communication with a memory on which is stored instructions which when executed on the processor implement a noise analyzer operative, based on the sensed conditions, to:
     identify a source of noise external to the vehicle and approaching the vehicle;
     determine a likelihood that the noise source will disrupt operation of the voice recognition system; and
     estimate an amount of time remaining before the disruption is likely to begin; and
   means for instantiating a countermeasure to the disruption based on the noise source identity, the likelihood of the disruption, and the estimated time remaining.

2. The system of claim 1, wherein the countermeasure includes warning an occupant of the vehicle that operation of the vehicle voice recognition system could be impaired.

3. The system of claim 1, wherein:
   the memory stores a plurality of noise profiles, each profile representative of a different source of noise; and
   the noise analyzer selects the stored noise profile corresponding to the identified noise source.

4. The system of claim 3, further comprising an active noise cancellation (ANC) system in communication with the voice recognition system, wherein the countermeasure includes the ANC system modifying the voice signal using the select noise profile.

5. The system of claim 4, wherein the ANC system uses the select noise profile to provide initial parameters to an adaptive filter.

6. A system for countering disruption to a system that uses a voice input signal (voice system) caused by a source of noise in proximity to the vehicle, comprising:
   an in-vehicle microphone that obtains a voice signal for input to the voice system;
   a plurality of sensors operative to sense conditions external to the vehicle;
   a tangible data processor coupled to the sensors and in data communication with a memory on which is stored instructions which when executed on the processor implement a noise analyzer operative, based on the sensed conditions, to:
     identify a source of noise external to the vehicle and approaching the vehicle;
     determine a likelihood that the noise source will disrupt operation of the voice system;
     estimate an amount of time remaining before the disruption is likely to begin; and
   a countermeasure device operative to initiate a countermeasure to mitigate the disruption based on the noise source identity, the likelihood of the disruption, and the estimate of the time remaining.

7. The system of claim 6, wherein the sensors include at least one of an external microphone, a radar antenna, a camera, an ultrasonic sensor, an infrared receiver, and a radio receiver.

8. The system of claim 6, wherein the voice system includes one of a speech detection system (SDS) and a mobile phone.

9. The system of claim 6, wherein:
the memory stores a message warning that the voice system could be disrupted;
the countermeasure device includes at least one of a display and a speaker operative to present the warning message to an occupant of the vehicle; and
the countermeasure includes presenting the warning message.

10. The system of claim 6, wherein:
the memory stores a plurality of noise profiles, each profile representative of a different noise source; and
the noise analyzer selects the stored noise profile corresponding to the identified noise source.

11. The system of claim 10, further comprising an active noise cancellation (ANC) system in communication with the voice system, wherein the countermeasure includes the ANC system modifying the voice signal using the select noise profile.

12. The system of claim 11, wherein the ANC system uses the select noise profile to provide initial parameters to an adaptive filter.

13. The system of claim 10, wherein at least a portion of the noise profiles include characteristics representative of an acoustic environment external to the vehicle.

14. The system of claim 10, wherein at least a portion of the noise profiles include characteristics representative of an acoustic environment of the vehicle passenger compartment.

15. A vehicle with a system that uses a voice signal (voice system), the vehicle able to mitigate disruption to the voice system caused by a source of noise in proximity to the vehicle, comprising:
an in-vehicle microphone that obtains a voice signal for input to the voice system;
a plurality of sensors operative to sense conditions external to the vehicle;
a tangible data processor coupled to the sensors and in data communication with a memory on which is stored instructions which when executed on the processor implement a noise analyzer operative, based on the sensed conditions, to:
identify a source of noise external to the vehicle and approaching the vehicle;
determine a likelihood that the noise source will disrupt operation of the voice system;
estimate an amount of time remaining before the disruption is likely to begin; and
a countermeasure device operative to initiate a countermeasure to mitigate the disruption based on the noise source identity, the likelihood of the disruption, and the estimate of the time remaining.

16. The vehicle of claim 15, wherein:
the memory stores a plurality of noise profiles, each profile representative of a different noise source; and
the noise analyzer selects the stored noise profile corresponding to the identified noise source.

17. The vehicle of claim 16, further comprising an active noise cancellation (ANC) system in communication with the voice system, wherein the countermeasure includes the ANC system modifying the voice signal using the select noise profile.

18. The vehicle of claim 17, wherein the ANC system uses the select noise profile to provide initial parameters to an adaptive filter.

19. The vehicle of claim 16, wherein at least a portion of the noise profiles include characteristics representative of an acoustic environment external to the vehicle.

20. The vehicle of claim 16, wherein at least a portion of the noise profiles include characteristics representative of an acoustic environment of the vehicle passenger compartment.

21. A method of mitigating disruption to a system in a vehicle that uses a voice signal (voice system) caused by a source of noise in proximity to the vehicle, comprising:
obtaining with an in-vehicle microphone a voice signal for input to the voice system;
sensing with a plurality of sensors a set of conditions external to the vehicle;
based on the sensed conditions using a processor executing instructions stored on a memory:
identifying a source of noise external to the vehicle and approaching the vehicle;
determining a likelihood that the noise source will disrupt operation of the voice system;
estimating an amount of time remaining before the disruption is likely to begin; and
selecting one of a plurality of noise profiles stored on the memory based on the noise source identity; and
initiating a countermeasure to mitigate the disruption based on the select noise profile, the likelihood of the disruption, and the estimate of the time remaining.

22. The method of claim 21, wherein:
the memory stores a message warning that an approaching noise source is about to disrupt operation of the vehicle voice recognition system;
the countermeasure device includes at least one of a display and a speaker operative to present the warning message to an occupant of the vehicle; and
the countermeasure includes presenting the warning message.

23. The method of claim 21, wherein at least a portion of the noise profiles include characteristics representative of an acoustic environment external to the vehicle.

24. The method of claim 21, wherein at least a portion of the noise profiles include characteristics representative of an acoustic environment of the vehicle passenger compartment.

25. The method of claim 21, wherein the countermeasure includes an active noise cancellation (ANC) system in communication with the voice system modifying the voice signal using the select noise profile.

26. The method of claim 25, wherein the ANC system uses the select noise profile to provide initial parameters to an adaptive filter.

* * * * *